(12) United States Patent
Fukushima et al.

(10) Patent No.: US 12,510,279 B2
(45) Date of Patent: Dec. 30, 2025

(54) COMPRESSOR, AND CONTROL METHOD FOR SAME

(71) Applicant: KOBELCO COMPRESSORS CORPORATION, Tokyo (JP)

(72) Inventors: Yosuke Fukushima, Hyogo (JP); Koki Takeuchi, Hyogo (JP); Katsunori Hamada, Hyogo (JP); Kazuyuki Yoda, Hyogo (JP)

(73) Assignee: KOBELCO COMPRESSORS CORPORATION, Tokyo (JP)

( * ) Notice: Subject to any disclaimer, the term of this patent is extended or adjusted under 35 U.S.C. 154(b) by 215 days.

(21) Appl. No.: 18/549,315

(22) PCT Filed: Mar. 7, 2022

(86) PCT No.: PCT/JP2022/009758
§ 371 (c)(1),
(2) Date: Sep. 6, 2023

(87) PCT Pub. No.: WO2022/196416
PCT Pub. Date: Sep. 22, 2022

(65) Prior Publication Data
US 2024/0142151 A1  May 2, 2024

(30) Foreign Application Priority Data
Mar. 17, 2021  (JP) ................. 2021-043713

(51) Int. Cl.
*F04C 29/04* (2006.01)
*F04B 39/06* (2006.01)
*F25B 49/02* (2006.01)

(52) U.S. Cl.
CPC ............ *F25B 49/022* (2013.01); *F04B 39/06* (2013.01); *F04C 29/04* (2013.01);
(Continued)

(58) Field of Classification Search
CPC ........ F25B 49/022; F04C 29/04; F04C 39/06; F04C 2210/221
See application file for complete search history.

(56) References Cited

U.S. PATENT DOCUMENTS

2018/0320927 A1* 11/2018 Yamamoto .............. F04B 53/08
2019/0241060 A1*  8/2019 Hara ..................... E02F 9/2095
(Continued)

FOREIGN PATENT DOCUMENTS

JP  2005-061402 A  3/2005
JP  2021-050667 A  4/2021

OTHER PUBLICATIONS

Notification of Transmittal of Translation of the International Preliminary Report on Patentability and. Translation of Written Opinion of the International Searching Authority; PCT/JP2022/009758; mailed on Sep. 28, 2023.
(Continued)

*Primary Examiner* — Jonathan Bradford
(74) *Attorney, Agent, or Firm* — Studebaker Brackett PLLC

(57) ABSTRACT

A compressor includes: a compressor body that suctions and compresses a gas to be compressed; heat exchangers that circulate a cooled target inside the heat exchangers to cool the cooled target; a fan that is driven by a fan motor and that sends a cooling gas to the heat exchangers to remove heat; a temperature sensor that detects an initial cooling gas temperature that is a temperature of the cooling gas not having been subject to heat removing for the heat exchangers; and a control unit that is capable of setting an upper limit frequency that is an upper limit for controlling a rotational frequency of the fan motor. The control unit sets the upper limit frequency to a rotational frequency equal to or lower than a frequency at which current at an acceptable current
(Continued)

level is supplied to the fan motor, at each of the initial cooling gas temperatures detected by the temperature sensor.

12 Claims, 8 Drawing Sheets

(52) U.S. Cl.
 CPC ... *F25B 2313/0314* (2013.01); *F25B 2600/11* (2013.01); *F25B 2700/21151* (2013.01); *F25B 2700/21152* (2013.01)

(56) References Cited

U.S. PATENT DOCUMENTS

| 2019/0242382 A1* | 8/2019 | Kotani | F04B 39/0284 |
| 2020/0240415 A1* | 7/2020 | Kotani | F04B 49/20 |
| 2022/0290605 A1 | 9/2022 | Hara | |

OTHER PUBLICATIONS

International Search Report issued in PCT/JP2022/009758; mailed Apr. 26, 2022.

* cited by examiner

--Prior Art--

COMPRESSOR, AND CONTROL METHOD FOR SAME

CROSS-REFERENCE TO RELATED APPLICATIONS

This is a national phase application in the United States of International Patent Application No. PCT/JP2022/009758 with an international filing date of Mar. 7, 2022, which claims priority of Japanese Patent Application No. 2021-043713 filed on Mar. 17, 2021 the contents of which are incorporated herein by reference.

TECHNICAL FIELD

The present disclosure relates to a compressor and a compressor control method.

BACKGROUND ART

There is a known compressor including an air cooler. Such a cooler includes a cooling fan having a fan driven by a fan motor the rotation speed of which is controllable, and a heat exchanger (gas cooler or oil cooler) that exchanges heat between a cooled target and external air, by driving the cooling fan (see JP 2005-61402 A, for example).

Usually in such an air-cooled cooler, to prevent overload of the fan motor, a fixed upper limit is set to the frequency so that the rotational speed of the fan motor does not exceed a fixed level. This is intended to prevent tripping of the fan motor (interruption of the power supply to the fan motor to protect the fan motor) resultant of overcurrent (overload), by preventing over-rotation of the fan motor.

Generally, even if the rotational frequency of the fan motor remains constant, the power for driving the fan changes proportionally to the air density. Therefore, when the ambient temperature of a place where the fan motor is installed drops, the load of the fan motor increases. Similarly, the load of the fan motor also increases or decreases when there is a change in the flow resistance between where the air is suctioned by the fan and where the air is discharged. Therefore, to control the rotational speed of the fan motor, the fan motor is set with an acceptable current level so that the power supply to the fan motor is interrupted to protect the fan motor when there is a current output exceeding the acceptable level by an amount equal to or higher than a certain amount.

SUMMARY OF THE INVENTION

Problems to be Solved by the Invention

Although not described in Patent Document 1, a heat exchanger and a fan in a compressor are often configured to deprive a fixed amount of heat. The amount Q of heat exchanged by the cooling air in the heat exchanger can be obtained using the following Equation (1).

[Equation 1]

$$Q = \rho \cdot c \cdot V(T_o - T_a) \quad (1)$$

In Equation (1), $\rho$ denotes an air density; $c$ denotes a specific heat ratio; and $V$ denotes a volumetric flow rate of the cooling air; $T_o$ denotes a temperature of the cooling air having passed through the heat exchanger; and $T_a$ denotes a temperature of the cooling air before passing through the heat exchanger (ambient temperature). As well understood from the above Equation (1), in order to keep the amount of heat exchanged constant when there is a rise in the ambient temperature $T_a$ while the air temperature $T_o$ having passed through the heat exchanger is constant, the volumetric flow rate V of the cooling air needs to be increased. A rise in the ambient temperature $T_a$ results in a rise in the temperature $T_o$ of the cooling air having passed through the heat exchanger. However, the temperature $T_o$ of the cooling air is also affected by the temperature of the cooled target. Therefore, in reality, the temperature $T_o$ of the cooling air raises less than a rise in the ambient temperature $T_a$. Because the volumetric flow rate V of the cooling air is proportional to the rotational frequency of the fan, the upper limit of the rotational frequency of the fan is often determined given highest ambient temperature $T_a$. At the same time, because the fan power for driving the fan is proportional to the cube of the rotational frequency, and the fan motor current is proportional to the fan power, a small increase in the rotational frequency results in a surge in the fan motor current. When the ambient temperature drops further, whereby causing the air density to increase, the fan power is also increased, and the fan motor may experience overcurrent.

An object of the present disclosure is to prevent overcurrent of a fan motor in a compressor due to a change in ambient temperature.

Means for Solving the Problems

A first aspect of the present disclosure provides a compressor comprising: a compressor body that suctions and compresses a gas to be compressed; a heat exchanger that circulates a cooled target inside the heat exchanger to cool the cooled target; a fan that is driven by a fan motor and that sends a cooling gas along an outer surface of the heat exchanger to remove heat; a temperature sensor that detects an initial cooling gas temperatures that are temperatures of the cooling gas not having been subject to heat removing for the heat exchanger; and a control unit that is capable of setting an upper limit frequency that is an upper limit for controlling a rotational frequency of the fan motor, wherein the control unit sets the upper limit frequency to a rotational frequency equal to or lower than a frequency at which current at an acceptable current level is supplied to the fan motor at each of the initial cooling gas temperatures detected by the temperature sensor.

In general, the power for driving the fan is proportional to the air density even when the rotational frequency of the fan motor is constant. Therefore, the lower the ambient temperature, the higher the load on the fan motor. The control unit sets an upper limit frequency of the fan motor to a rotational frequency equal to or lower than the frequency at which current at an acceptable current level is supplied to the fan motor, at each of the initial cooling gas temperatures detected by the temperature sensor Therefore, it is possible to prevent overcurrent in the fan motor due to a change in ambient temperature.

The control unit stores therein a relationship between the initial cooling gas temperatures and the upper limit frequency, and the relationship is set so that the more lower the initial cooling gas temperatures are, the more lower the upper limit frequency is.

The control unit may store therein a relationship between an initial cooling gas temperatures and an upper limit frequency, and the relationship is set so as to lower the upper limit frequency continuously or incrementally when the initial cooling gas temperatures drop further.

The control unit may store therein a relationship between an initial cooling gas temperature and an upper limit frequency, and the upper limit frequency of the relationship may be set so as to keep the current to be supplied to the fan motor at a constant level at each of the initial cooling gas temperatures.

The compressor may include a package in which the compressor body, the fan, the fan motor, and the heat exchanger are accommodated.

The temperature sensor may be disposed in an intake opening of the package, and measure a temperature of the cooling gas collected through the intake opening, as the initial cooling gas temperatures.

The temperature sensor may be disposed upstream of the fan, and measure temperatures of the cooling gas to be suctioned into the fan.

The temperature sensor may be disposed downstream of the fan, and between the fan and the heat exchanger, and measure temperatures of the cooling gas discharged from the fan.

The gas to be compressed and the cooling gas may be the same gas, and the temperature sensor may be disposed in a suction channel of the compressor body, and measure temperatures of the same gas to be suctioned into the compressor body through the suction channel.

The compressor may include a gas cooler that cools a discharged gas from the compressor body as the cooled target, and the gas cooler may include the heat exchanger.

The compressor may also include an oil cooler that cools oil supplied to the compressor body as the cooled target, and the oil cooler may include the heat exchanger.

A second aspect of the present disclosure provides a method of controlling a compressor comprising: a compressor body that suctions and compresses a gas to be compressed; a heat exchanger that circulates a cooled target inside the heat exchanger to cool the cooled target; and a fan that is driven by a fan motor and that sends a cooling gas to the heat exchanger to remove heat, the method comprising: causing a temperature sensor to detect an initial cooling gas temperatures that are temperatures of the cooling gas not having been subject to heat removing for the heat exchanger; and setting an upper limit frequency that is an upper limit for controlling a rotational frequency of the fan motor to a rotational frequency equal to or lower than a frequency at which current at an acceptable current level is supplied to the fan motor, at each of the initial cooling gas temperatures detected by the temperature sensor.

Effects of the Invention

According to the present disclosure, it is possible to prevent overcurrent of a fan motor in a compressor, due to a change in ambient temperature.

DETAILED DESCRIPTION OF EMBODIMENTS

Embodiments of the present disclosure will now be described with reference to the accompanying drawings.

First Embodiment

Figure 1:
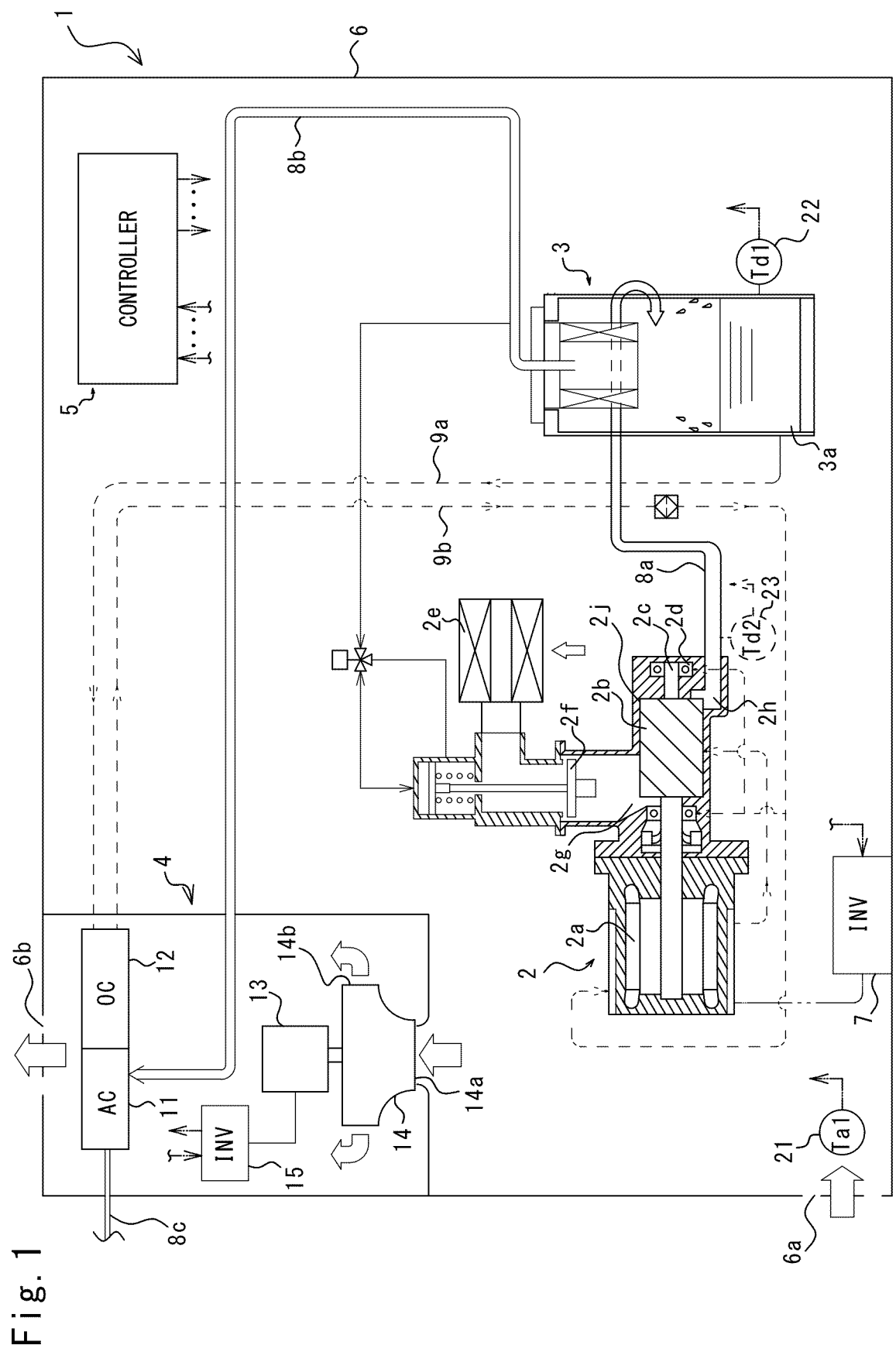
FIG. 1 is a schematic system diagram of a compressor according to a first embodiment of the present disclosure.

Referring to FIG. 1, a compressor 1 according to a first embodiment includes a compressor body 2, an oil separation and recovery unit 3, a housing 4, a controller (control unit) 5, and a package 6 in which these components are housed.

In the present embodiment, the compressor body 2 is an oil-cooled screw compressor. The compressor body 2 includes a pair of screw rotors 2b driven in rotation by a main motor 2a. The rotation speed of the main motor 2a is controlled by a main inverter 7. A bearing 2d rotatably supports the rotor shaft 2c of the corresponding screw rotor 2b. The pair of screw rotors 2b compresses the gas to be compressed (the air in the present embodiment) suctioned from a suction channel 2g via a filter 2e and a suction valve 2f, and the gas is discharged from a discharge port 2h. The gas to be compressed is not limited to the air, and may be gas other than the air, such as nitrogen gas. In the present specification, for convenience, the gas suctioned through the suction channel 2g is referred to as "gas to be compressed", and the gas discharged from the discharge port 2h is referred to as "discharged gas".

The oil separation and recovery unit 3 is connected to a discharge port 2h of the compressor body 2 via a gas channel 8a, and is connected to a heat exchanger 11 included in an aftercooler that is a gas cooler, which is to be described later, via a gas channel 8b. The discharged gas from the discharge port 2h of the compressor body 2 is sent to the oil separation and recovery unit 3 via the gas channel 8a. The oil included in the discharged gas from the discharge port 2h of the compressor body 2 is separated from the discharged gas in the oil separation and recovery unit 3, and is stored in an oil sump 3a at the bottom of the oil separation and recovery unit 3. The discharged gas from the oil separation and recovery unit 3 is sent to the heat exchanger 11 via the gas channel 8b, cooled in the heat exchanger 11, and then sent to a destination (not shown) to which the gas is supplied, via a gas channel 8c.

The oil sump 3a of the oil separation and recovery unit 3 is connected to a heat exchanger 12 included in an oil cooler, to be described later, via an oil channel 9a. The oil in the oil sump 3a is sent to the heat exchanger 12 via the oil channel 9a, cooled in the heat exchanger 12, and then supplied to an oil supply target, specifically, a rotor chamber 2j where the main motor 2a, a bearing 2d, and the screw rotors 2b of the compressor body 2 are housed, via the oil channel 9b. The oil supplied to the main motor 2a and the bearing 2d finally flows into the rotor chamber 2j. The oil flowing into the rotor chamber 2*j* is sent to the oil separation and recovery unit 3 together with the discharged gas.

The controller 5 controls controllable elements, including a fan inverter 15 of the compressor 1 based on inputs from various sensors including a package intake air temperature sensor 21 and an oil temperature sensor 22, to be described later, and a command entered by a higher-level control device or an operator.

The package 6 has an intake opening 6*a* for collecting the cooling gas and the gas to be compressed from the place where the compressor 1 is installed into the package 6, and an exhaust opening 6*b* for discharging the gas inside the package 6 to the outside of the package 6. It is possible to provide separate intake openings for collecting the cooling gas from the outside of the package 6 and for collecting the gas to be compressed from the outside of the package 6.

The heat exchangers 11, 12 and the fan 14 are housed in the housing 4. The heat exchangers 11, 12 cool the cooled target by circulating the cooled target. More specifically, each of the heat exchangers 11, 12 cools the cooled target by allowing the cooling gas collected from the outside of the housing 4 to flow along the outer surface of the heat exchanges 11, 12 and to exchange heat with the cooled target being circulated through the heat exchanger 11, 12. In the present embodiment, the aftercooler includes the heat exchanger 11, and the oil cooler includes the heat exchanger 12. The aftercooler cools the discharged gas from the compressor body 2, as the cooled target. The oil cooler cools the oil to be supplied to the compressor body 2, as the cooled target. The fan 14 is driven in rotation by a fan motor 13 that is an AC motor, to suction the cooling gas (the air in the present embodiment) through a suction port 14*a*, and to discharge the cooling gas from a discharge port 14*b*. In the present embodiment, the fan 14 is a turbo fan, but may also be of another type of fan such as a sirocco fan. The cooling gas is not limited to the air, and may be nitrogen, for example.

In the present embodiment, the fan 14 is driven by the fan motor 13 to blow the cooling gas against the heat exchangers 11, 12 and to remove the heat. In other words, the fan 14 according to the present embodiment is a blower fan. The fan 14 is surrounded by a fan cover, collects the cooling gas from the outside of the housing 4, and suctions the cooling gas through the suction port 14*a* of the fan cover. In the present embodiment, the cooling gas discharged from the discharge port 14*b* of the fan cover extracts heat from (cools) the cooled target, as the cooling gas flows along the outer surfaces of the aftercooler 11 and the oil cooler 12, and then is discharged to the outside of the housing 4. In other words, in the present embodiment, the heat exchanger 11 included in the aftercooler and the heat exchanger 12 included in the oil cooler are disposed downstream of the fan 14. The heat exchanger 11 exchanges heat between the discharged gas and the cooling gas collected from the outside of the housing 4 and supplied by the fan 14, to cool the discharged gas. The oil cooler 12 exchanges heat between the cooling gas collected from the outside of the housing 4 and supplied by the fan 14 and the oil, to cool the oil. In the present embodiment, since the fan 14 is disposed upstream of the heat exchangers 11, 12, the heat exchanges are less likely affected by the density of the cooling gas around the fan (the density of the air in the present embodiment). Therefore, a configuration using the present disclosure is more useful than a configuration in which the fan 14 is disposed downstream of the heat exchangers 11, 12.

The fan inverter 15 is capable of controlling the rotational speed of the fan motor 13, that is, the rotational speed of the fan 14. As will be described later in detail, the fan inverter 15 can set an upper limit to the frequency of the current to be supplied to the fan motor 13.

The compressor 1 includes a package intake air temperature sensor 21 as a temperature sensor for detecting the temperature of the cooling gas (the air in the present embodiment) collected from the outside of the package 6 (hereinafter, referred to as an ambient temperature), that is, a temperature of the cooling gas before passing through the heat exchangers 11, 12 (hereinafter, referred to as an initial cooling gas temperature). The package intake air temperature sensor 21 is provided in the intake opening 6*a* of the package 6, and measures the temperature of the cooling gas suctioned through the intake opening 6*a*, as an initial cooling gas temperature. In the present embodiment in which the cooling gas is the air, the package intake air temperature sensor 21 detects the temperature of the outside air directly. A gas temperature Ta1 (an example of an initial cooling gas temperature) measured by the package intake air temperature sensor 21 is sent to the controller 5.

The compressor 1 includes an oil temperature sensor 22 that measures the temperature of the oil in the oil sump 3*a* inside the oil separation and recovery unit 3, as a discharge temperature sensor for detecting the temperature of the discharged gas discharged from the discharge port 2*h* of the compressor body 2. In other words, in the present embodiment, the temperature of the discharged gas from the compressor body 2 is detected indirectly by the oil temperature sensor 22. The oil temperature Td1 measured by the oil temperature sensor 22 is sent to the controller 5. It is also possible to use a discharge temperature sensor 23 that is provided at the discharge port 2*h* of the compressor body 2, and that measures the temperature of the discharged gas, that is, the discharge temperature Td2, and sends the measured temperature to the controller 5, instead of the oil temperature sensor 22.

Control executed by the controller 5 and by the fan inverter 15 will now be explained.

Figure 2:
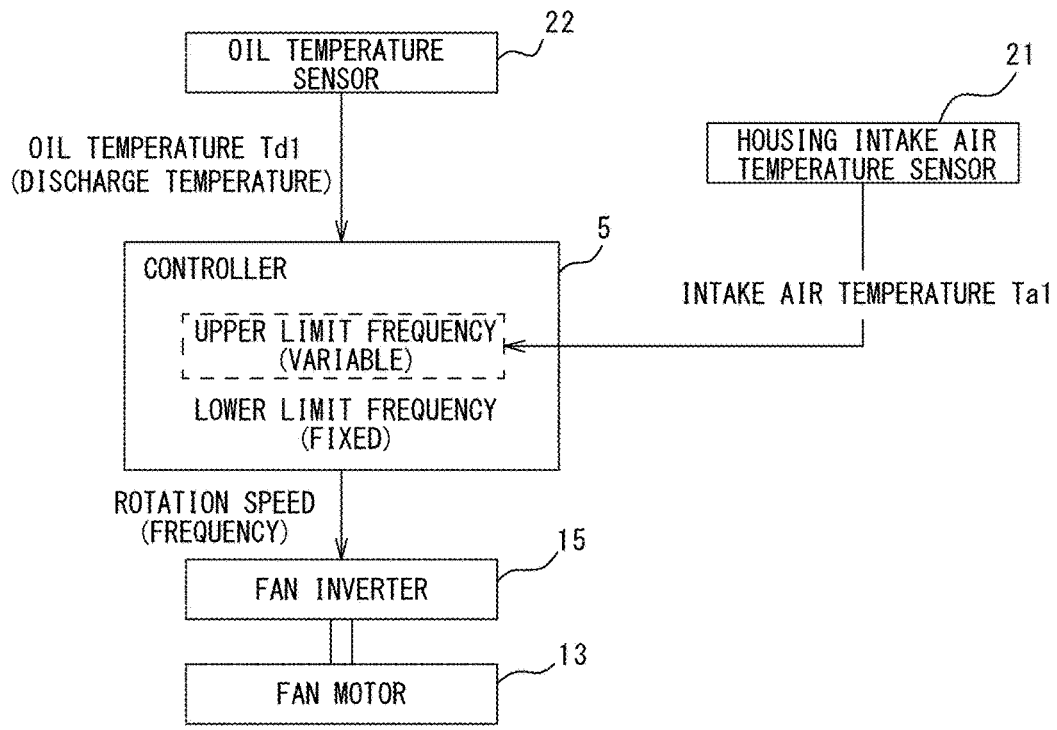
FIG. 2 is a block diagram for explaining a concept of control in the compressor according to the first embodiment of the present disclosure.

Referring also to FIG. 2, the controller 5 stores therein a lower limit (lower limit frequency) and an upper limit (upper limit frequency) to the frequency of the current supplied by the fan inverter 15 to the fan motor 13, and controls the frequency of the fan inverter 15, which is equivalent to the rotational speed of the fan motor 13, within a range between the lower limit frequency and the upper limit frequency. In the present embodiment, the controller 5 controls the frequency of the fan inverter 15 in accordance with the oil temperature Td1 input from the oil temperature sensor 22. For example, when the oil temperature Td1 is higher than a predetermined temperature, the controller 5 increases the frequency of the fan inverter 15 (increases the rotational speed of the fan motor 13), to increase the cooling power of the aftercooler 11 and the oil cooler 12. By contrast, when the oil temperature Td1 is lower than the predetermined temperature, the controller 5 decreases the frequency of the fan inverter 15 (decreases the rotational speed of the fan motor 13), to suppress the cooling power of the aftercooler 11 and the oil cooler 12.

The fan inverter 15 compares the value of the current supplied from the fan inverter 15 to the fan motor 13 against a predetermined threshold (e.g., a value resultant of adding a likelihood to a rated current of the fan motor 13). When the value of the current supplied to the fan motor 13 reaches the threshold, the fan inverter 15 causes the power to trip (interrupts the power supply from the fan inverter 15 to the fan motor 13) so as to protect the fan motor 13.

Figure 3:
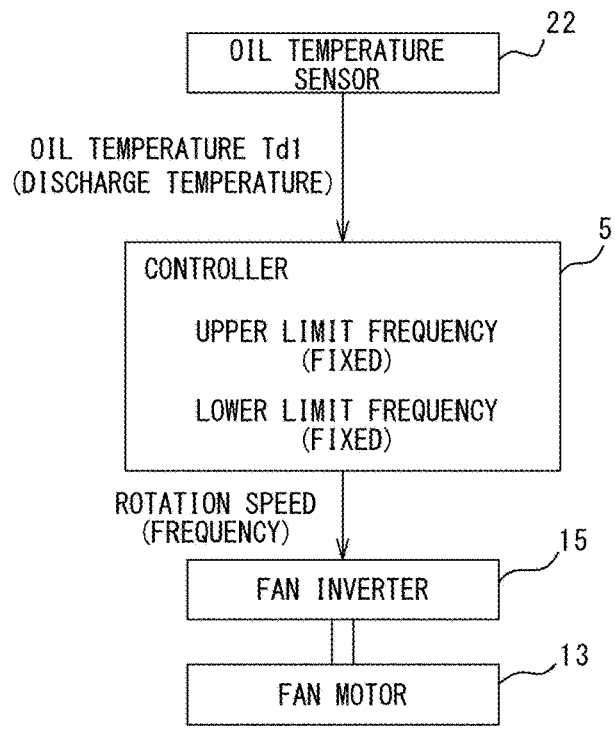
FIG. 3 is a block diagram for explaining a concept of control in a conventional compressor.

The control explained so far is the same as the control executed by the controller 5 in the present embodiment illustrated in FIG. 2 and conventional control illustrated in FIG. 3. In particular, the control executed by the controller 5 in the present embodiment illustrated in FIG. 2 and the conventional control illustrated in FIG. 3 both keep the lower limit frequency of the fan inverter 15 fixed (that is, the lower limit frequency remains constant regardless of the oil temperature Td1, the gas temperature Ta1, and the like). However, while the conventional control illustrated in FIG. 3 also uses a fixed upper limit for the frequency of the fan inverter 15 (that is, the upper limit also remains constant regardless of the oil temperature Td1, the gas temperature Ta1, and the like), the upper limit frequency of the fan inverter 15 used in the control executed by the controller 5 in the present embodiment illustrated in FIG. 2 is variable. This point will now be explained.

Even when the rotational frequency of the fan motor 13 is constant, when the temperature of the outside air outside the package 6 in the place where the compressor 1 is installed (ambient temperature), that is, the temperature of the outside air used as the cooling gas (corresponding to the initial temperature of the cooling gas) drops, the load of the fan motor 13 increases, and the chance of power tripping also increases. This is because, as the gas density of the cooling gas blown by the fan 14 increases, the power is increased, and as the temperature of the cooling gas decreases, the density of the cooling gas increases. Therefore, when the detected initial cooling gas temperature (the gas temperature Ta1 measured by the package intake air temperature sensor 21 in the present embodiment) is lower, that is, when the gas density is higher and the power is increased, the controller 5 lowers the setting of the upper limit frequency for the fan inverter 15. In this manner, it is possible to prevent tripping resultant of the overcurrent in the fan motor 13 inside the housing 4, due to a change in the ambient temperature of the place where the compressor 1 is installed.

Figure 4:
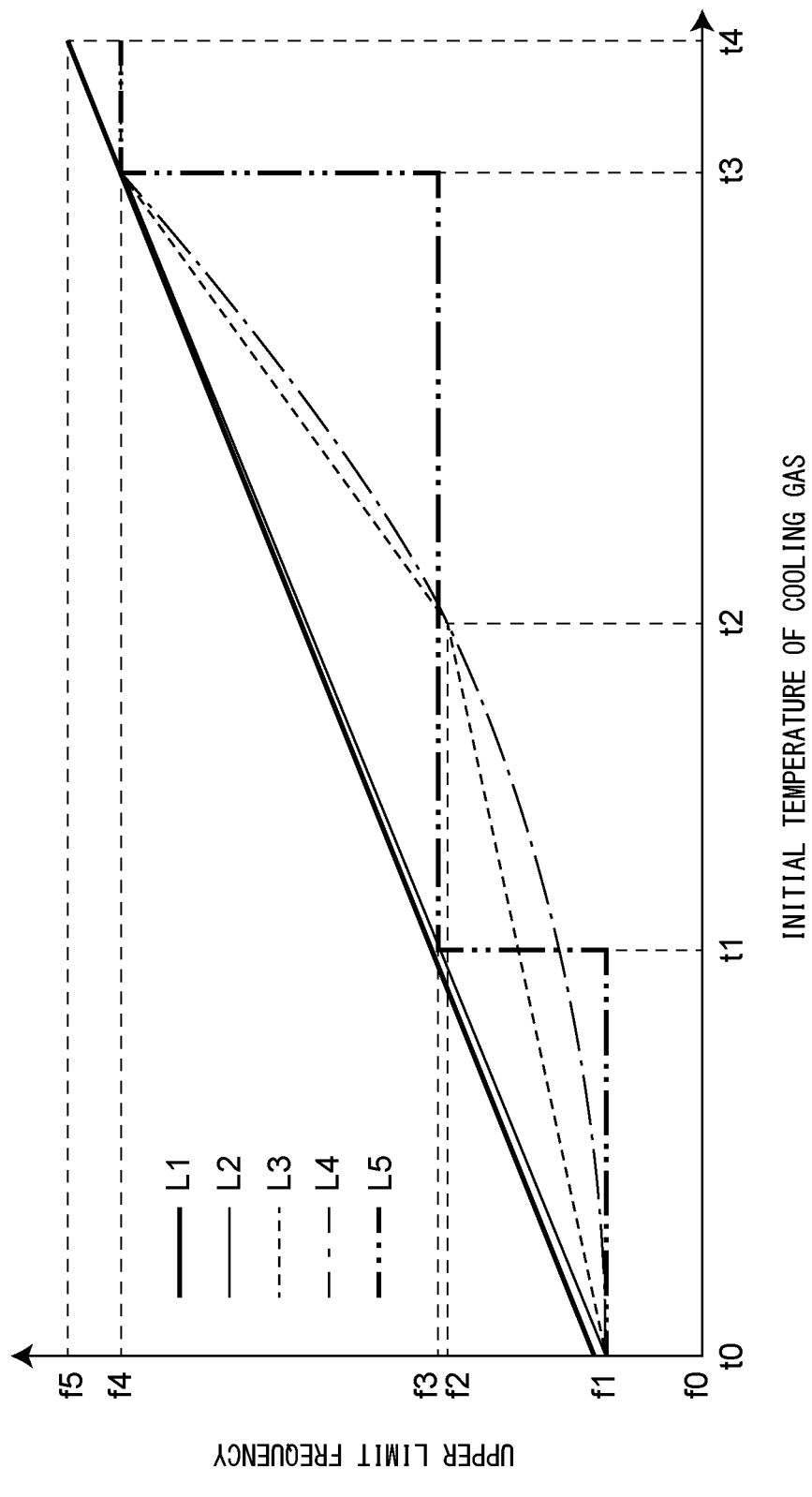
FIG. 4 is a schematic graph showing a relationship between an initial temperature of cooling gas and an upper limit of a fan frequency.

FIG. 4 illustrates various examples (relationships L1 to L5) of a relationship between the initial temperature of the cooling gas and the upper limit frequency of the fan inverter 15, stored in the controller 5.

In the relationships L1 to L5, the upper limit frequency is set in such a manner that a current equal to or lower than an acceptable current level is supplied to the fan motor 13, at each initial cooling gas temperature within the range between initial cooling gas temperatures t0 and t4. In the relationships L1 to L3, the upper limit frequency setting is lowered continuously as the ambient temperature drops. In the relationship L5, the upper limit frequency setting is lowered incrementally as the initial temperature of the cooling gas drops.

The relationship L1 between the initial cooling gas temperature and the upper limit frequency of the fan inverter 15 is set in such a manner that the acceptable level of current is supplied to the fan motor 13 at each of the initial cooling gas temperatures within the range of the initial cooling gas temperatures between t0 and t4. The relationship L1 is a linear function including an upper limit frequency f1 at which the acceptable level of current is supplied to the fan motor 13 at the initial cooling gas temperature t0, and an upper limit frequency f5 at which the acceptable level of current is supplied to the fan motor 13 at the initial cooling gas temperature t4. In the graph of FIG. 4, when the relationship of the initial cooling gas temperature and the upper limit frequency of the fan inverter 15 is in the range below the solid thick line indicating the relationship L1, the upper limit frequency is set with respect to each of the initial cooling gas temperatures in such a manner that a current at a level below the acceptable current level is supplied to the fan motor 13. Therefore, if the initial cooling gas temperature and the upper limit frequency satisfy the relationship L1 or if the relationship between the initial cooling gas temperature and the upper limit frequency is defined within this range, it is possible to prevent an overcurrent in the fan motor 13 due to a decrease in the initial cooling gas temperature within the range between t0 and t4. The relationships L2 to L5 all fall within this range.

The relationship L2 of the initial cooling gas temperature and the upper limit frequency of the fan inverter 15 is defined as a linear function, in the same manner as the relationship L1. The relationship L2 establishes such an upper limit frequency that that the current supplied to the fan motor 13 is kept constant at each of the initial cooling gas temperatures.

The relationship L3 defines the relationship between the initial cooling gas temperature and the upper limit frequency of the fan inverter 15 as two linear functions. In other words, the relationship L3 is determined by a linear function including an upper limit frequency f1 at an initial cooling gas temperature t0 and an upper limit frequency f2 at an initial cooling gas temperature t2, and a linear function including an upper limit frequency f2 at the initial cooling gas temperature t2 and an upper limit frequency f4 at an initial cooling gas temperature t3.

The relationship L4 defines the relationship between the initial cooling gas temperature and the upper limit frequency of the fan inverter 15 as a downward-convex smooth function, that is, a downward-convex polynomial function connecting the upper limit frequency of f1 at the initial cooling gas temperature t0 and the upper limit frequency of f4 at the initial cooling gas temperature t3.

In the relationship L5, a change in the relationship between the initial temperature of the cooling gas and the upper limit frequency of the fan inverter 15 is defined as a 3-level staircase or step function. First, within a range of the initial cooling gas temperatures between t3 and t4, the upper limit frequency is kept constant at a frequency f4. Within a range of the initial cooling gas temperatures between t1 and t3 that is below the range mentioned above, the upper limit frequency is kept constant at a frequency f3 that is lower than the upper limit frequency f4. Within a range of the initial cooling gas temperatures between t0 and t1 that is below the range mentioned above, the upper limit frequency is kept constant at a frequency f1 that is lower than the upper limit frequency f3.

Second and third embodiments of the present disclosure will now be explained. In these embodiments, points that are not particularly mentioned are the same as those in the first embodiment.

Second Embodiment

Figure 5:
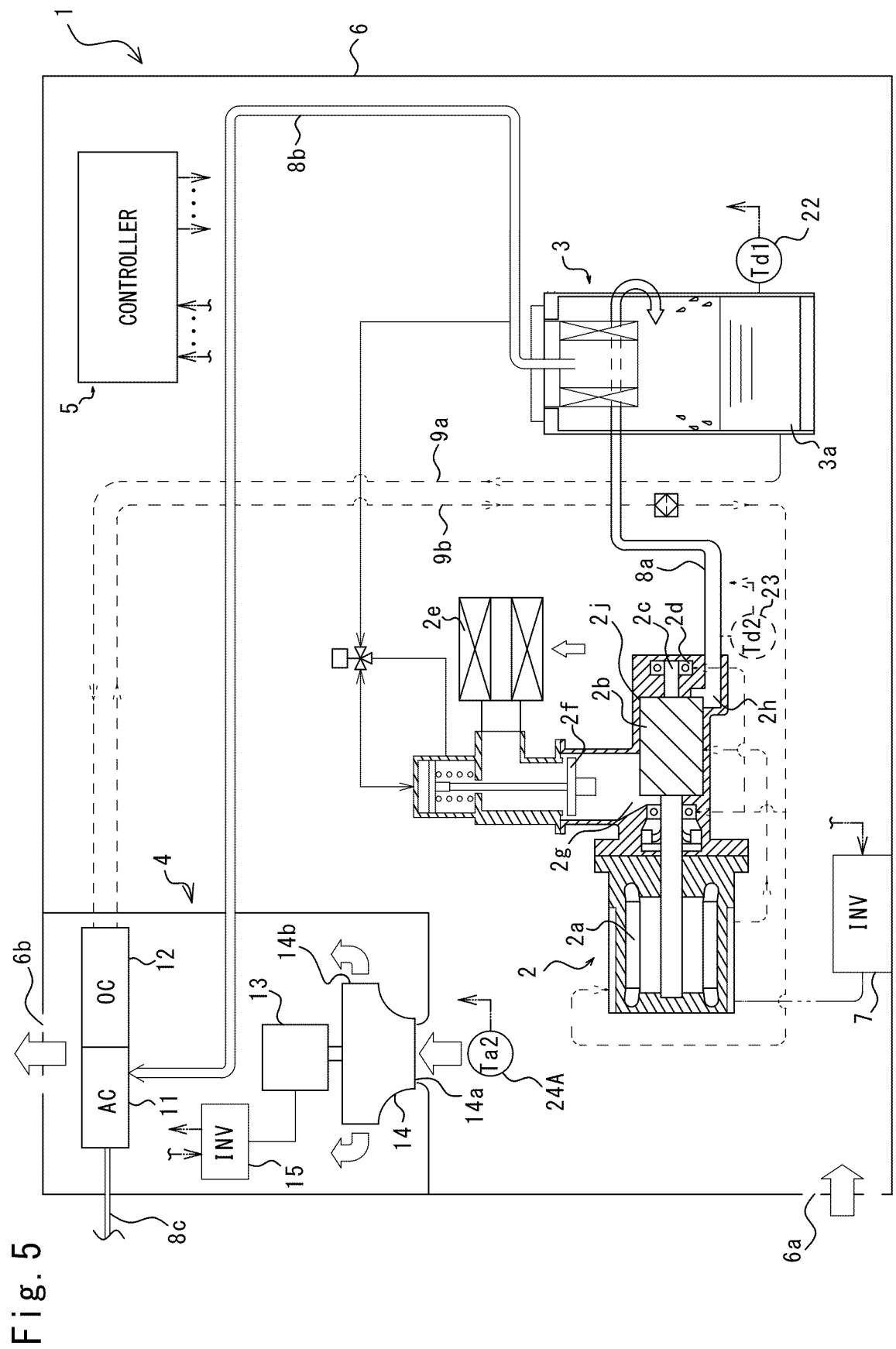
FIG. 5 is a schematic system diagram of a compressor according to a second embodiment of the present disclosure.

A compressor 1 according to a second embodiment of the present disclosure illustrated in FIG. 5 includes, as an air temperature sensor for detecting an initial temperature of the cooling gas, a fan gas temperature sensor 24A provided upstream of the fan 14 (e.g., immediately prior to the suction port 14*a*) and measuring the temperature of the cooling gas suctioned into the fan 14 through a suction port 14*a*, instead of the package intake air temperature sensor 21 (see FIG. 1). The controller 5 sets the upper limit frequency of the fan inverter 15 in the same manner as in the first embodiment, but based on a gas temperature Ta2 (an example of the initial temperature of the cooling gas) measured by the fan gas temperature sensor 24A.

Third Embodiment

Figure 6:
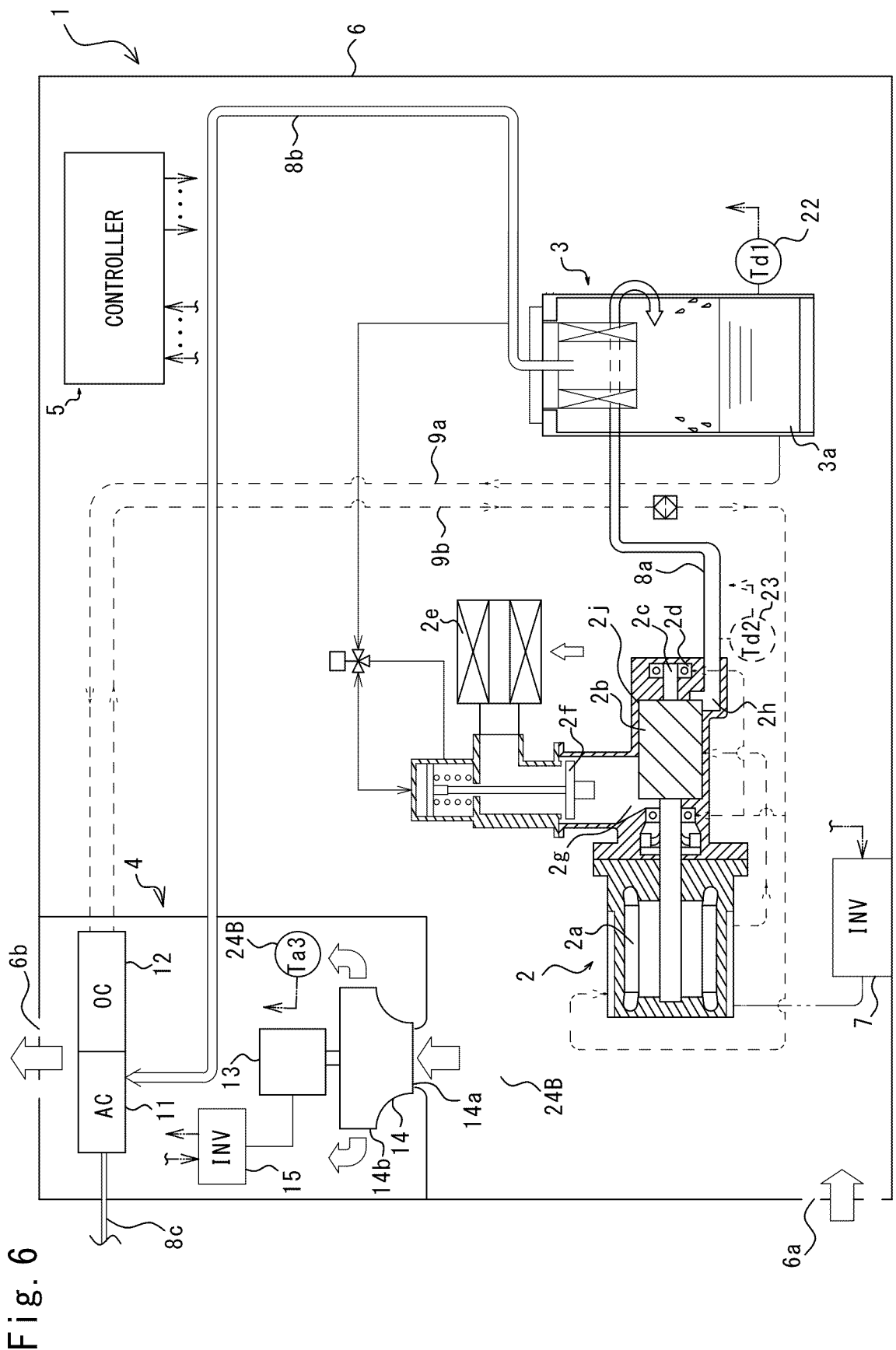
FIG. 6 is a schematic system diagram of a compressor according to a third embodiment of the present disclosure.

A compressor 1 according to a third embodiment of the present disclosure illustrated in FIG. 6 includes, as the air temperature sensor for detecting the initial temperature of the cooling gas, a fan gas temperature sensor 24B disposed downstream of the fan 14, and between the fan 14 and the heat exchangers 11, 12 (e.g., immediately subsequent to the discharge port 14b), and measuring the temperature of the cooling gas discharged from the discharge port 14b of the fan 14, instead of the package intake air temperature sensor 21 (see FIG. 1). The controller 5 sets the upper limit frequency of the fan inverter 15 in the same manner as in the first embodiment, but based on a gas temperature Ta3 (an example of the initial temperature of the cooling gas) measured by the fan gas temperature sensor 24B.

Fourth Embodiment

Figure 7:
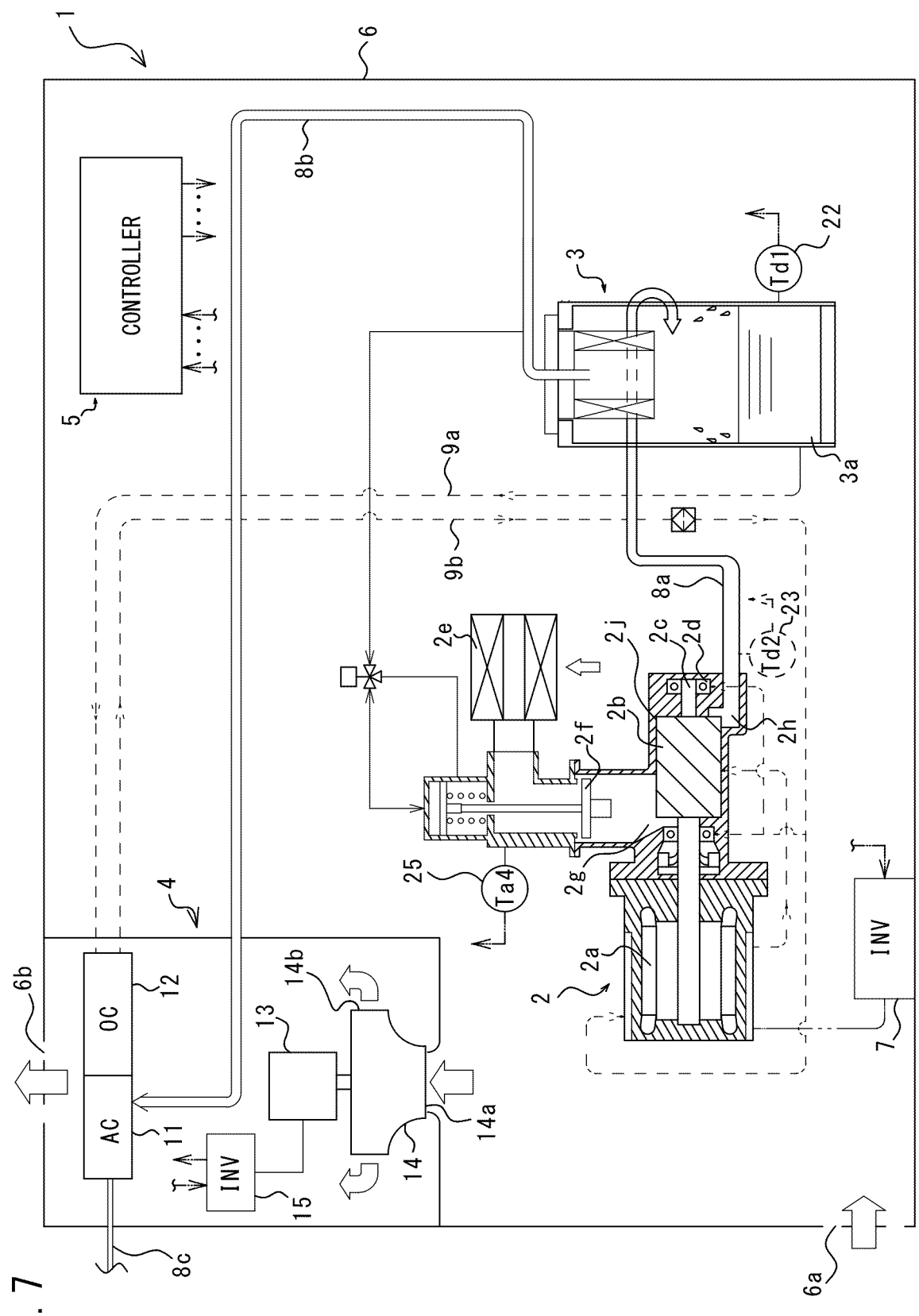
FIG. 7 is a schematic system diagram of a compressor according to a fourth embodiment of the present disclosure.

A compressor 1 according to a fourth embodiment of the present disclosure illustrated in FIG. 7 includes, as an air temperature sensor for detecting an initial temperature of a cooling gas, a compressor intake air temperature sensor 25 provided to the suction channel 2g in the compressor body 2 and measuring a temperature of the gas to be compressed suctioned into the compressor body 2 via the suction channel 2g, instead of the package intake air temperature sensor 21 (see FIG. 1). In the present embodiment, since the gas to be compressed and the cooling gas are the same gas, the controller 5 sets the upper limit frequency of the fan inverter 15 in the same manner as in the first embodiment, but based on the gas temperature Ta4 (an example of the initial temperature of the cooling gas) measured by the compressor intake air temperature sensor 25.

Figure 8:
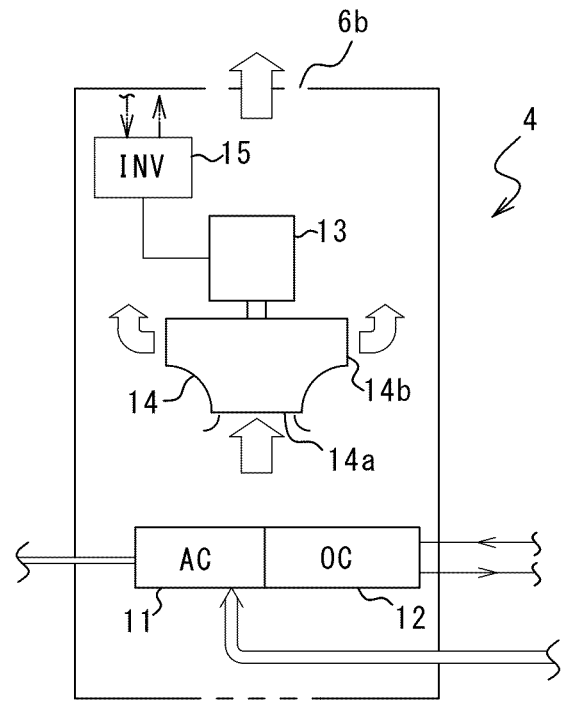
FIG. 8 is a schematic diagram showing a modification of the configuration inside of a housing.
Figure 9:
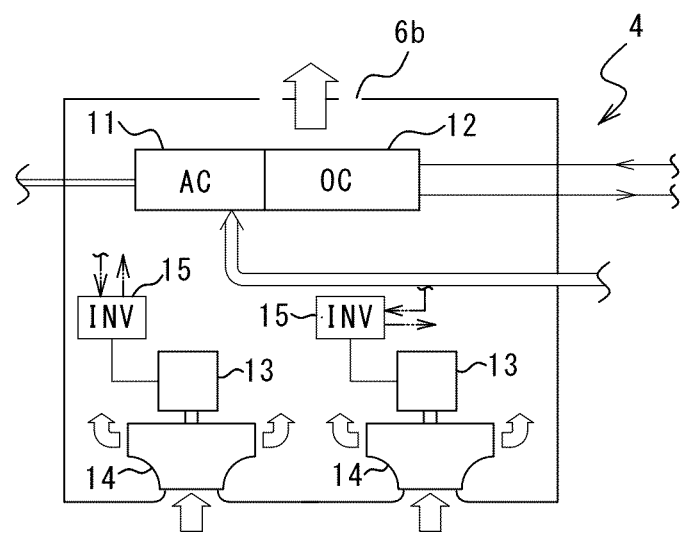
FIG. 9 is a schematic diagram showing a modification of the configuration inside of the housing.
Figure 10:
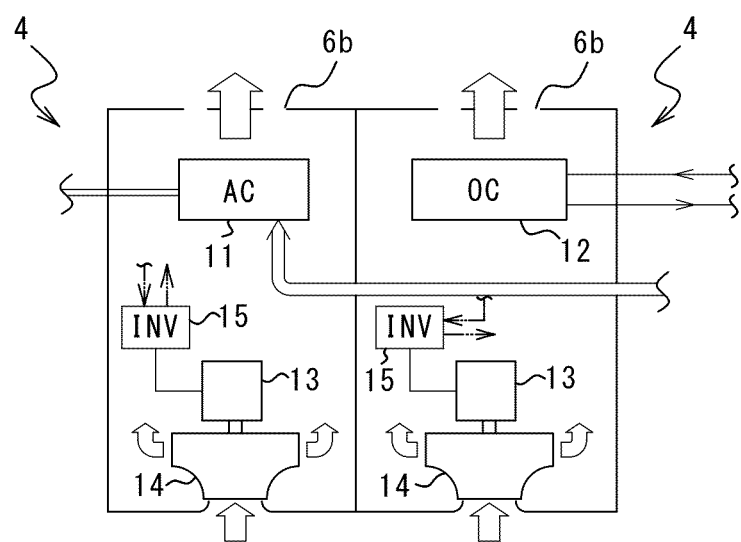
FIG. 10 is a schematic diagram showing a modification of the configuration inside of the housing.

FIGS. 8 to 10 show various modifications related to the internal configuration of the housing 4. These modifications may be applied to any of the first to third embodiments.

In the modification illustrated in FIG. 8, the heat exchangers 11, 12 are disposed not on the side of the discharge port 14b, but on the side of the suction port 14a of the fan 14. The cooling gas introduced into the housing 4 and suctioned into the suction port 14a of the fan 14 flows along the outer surfaces of the aftercooler 11 and the oil cooler 12, and exchanges heat. In other words, in the present embodiment, the aftercooler 11 and the oil cooler 12 are disposed upstream of the fan 14.

In the modification illustrated in FIG. 9, the cooling gas discharged through the discharge ports 14b of the two fans 14 flows along the outer surfaces of the aftercooler 11 and the oil cooler 12, and exchanges heat. The number of fans 14 may be three or more.

In the modification illustrated in FIG. 10, each of the heat exchangers 11, 12 includes a housing 4 and a fan.

Although the specific embodiments of the present disclosure and the modifications thereof have been described above, the present disclosure is not limited to the above embodiments, and various modifications may be made within the scope of the present invention. For example, in another embodiment of the present disclosure, the compressor body 2 may be an oil-free screw compressor. In the embodiments of the present disclosure, the outside air (air) is explained as an example of the cooling gas, but the cooling gas may be cooling gas other than the outside air. In the embodiments of the present disclosure, the configuration in which the compressor body 2, the oil separation and recovery unit 3, the housing 4, and the controller 5 are housed in the package 6 has been described, but it is also possible for the compressor 1 not to include the package 6. Furthermore, as the rotational speed control unit capable of controlling the rotational speed of the fan motor 13 and setting the upper limit frequency, a unit other than the inverter 15 may be used.

The invention claimed is:

1. A compressor comprising:
    a compressor body that suctions and compresses a gas to be compressed;
    a heat exchanger that circulates a cooled target inside the heat exchanger to cool the cooled target;
    a fan that is driven by a fan motor and that sends a cooling gas along an outer surface of the heat exchanger to remove heat;
    a temperature sensor that detects initial cooling gas temperatures that are temperatures of the cooling gas not having been subject to heat removing for the heat exchanger; and
    a control unit that is capable of setting an upper limit frequency that is an upper limit for controlling a rotational frequency of the fan motor, wherein
    the control unit sets the upper limit frequency to a rotational frequency equal to or lower than a frequency at which current at an acceptable current level is supplied to the fan motor at each of the initial cooling gas temperatures detected by the temperature sensor.

2. The compressor according to claim 1, wherein
    the control unit stores therein a relationship between the initial cooling gas temperatures and the upper limit frequency, and
    the relationship is set so that the lower the initial cooling gas temperatures are, the lower the upper limit frequency is.

3. The compressor according to claim 1, wherein
    the control unit stores therein a relationship between the initial cooling gas temperature and the upper limit frequency, and
    the relationship is set so as to lower the upper limit frequency continuously or incrementally when the initial cooling gas temperatures decrease.

4. The compressor according to claim 1, wherein
    the control unit stores therein a relationship between the initial cooling gas temperatures and the upper limit frequency, and
    the upper limit frequency of the relationship is set so as to keep the current to be supplied to the fan motor at a constant level at each of the initial cooling gas temperatures.

5. The compressor according to claim 1, further comprising a package in which the compressor body, the fan, the fan motor, and the heat exchanger are accommodated.

6. The compressor according to claim 5, wherein the temperature sensor is disposed in an intake opening of the package, and measures a temperature of the cooling gas collected through the intake opening, as the initial cooling gas temperatures.

7. The compressor according to claim 1, wherein the temperature sensor is disposed upstream of the fan, and measures temperatures of the cooling gas to be suctioned into the fan as the initial cooling gas temperatures.

8. The compressor according to claim 1, wherein the temperature sensor is disposed downstream of the fan, and between the fan and the heat exchanger, and measures temperatures of the cooling gas discharged from the fan as the initial cooling gas temperatures.

9. The compressor according to claim 1, wherein
the gas to be compressed and the cooling gas are same gas, and
the temperature sensor is disposed in a suction channel of the compressor body, and measures temperatures of the same gas to be suctioned into the compressor body through the suction channel as the initial cooling gas temperatures.

10. The compressor according to claim 1, further comprising a gas cooler that cools a discharged gas from the compressor body as the cooled target, wherein the gas cooler includes the heat exchanger.

11. The compressor according to claim 1, further comprising an oil cooler that cools oil supplied to the compressor body as the cooled target, wherein the oil cooler includes the heat exchanger.

12. A method of controlling a compressor comprising:
a compressor body that suctions and compresses a gas to be compressed;
a heat exchanger that circulates a cooled target inside the heat exchanger to cool the cooled target; and
a fan that is driven by a fan motor and that sends a cooling gas to the heat exchanger to remove heat, the method comprising:
causing a temperature sensor to detect initial cooling gas temperatures that are temperatures of the cooling gas not having been subject to heat removing for the heat exchanger; and
setting an upper limit frequency that is an upper limit for controlling a rotational frequency of the fan motor to a rotational frequency equal to or lower than a frequency at which current at an acceptable current level is supplied to the fan motor, at each of the initial cooling gas temperatures detected by the temperature sensor.

* * * * *